United States Patent Office 3,087,956
Patented Apr. 30, 1963

3,087,956
ALKYLENE OXIDE REACTION PRODUCTS
Roger G. Lacoste, Hopewell Junction, Herman D. Kluge, Fishkill, and Elmer E. Schallenberg, Beacon, N.Y., assignors to Texaco Inc., New York, N.Y., a corporation of Delaware
No Drawing. Filed Sept. 30, 1960, Ser. No. 59,505
9 Claims. (Cl. 260—461)

This invention relates to novel reaction products of alkylene oxides and hydrocarbon thiophosphonic acids. More particularly, this invention relates to mono-hydroxyalkyl hydrocarbyl thiophosphonates.

Alkaline earth metal salts of hydrocarbon thiophosphonic acids obtained by hydrolysis of phosphorus sulfide-hydrocarbon reaction products are widely used detergent and dispersant additives for lubricants employed in internal combustion engines. The novel alkylene oxide-hydrocarbyl thiophosphonic acid reaction products of this invention have demonstrated outstanding performance as lubricating oil additives and are also useful as fuel additives, particularly as anti-icing additives. A commonly-assigned copending application Serial No. 59,507 filed of even date, relates to lubricant compositions containing the hydroxyalkyl hydrocarbyl thiophosphonates of this invention.

The mono-hydroxyalkyl hydrocarbyl thiophosphonates of this invention are represented by the following formula:

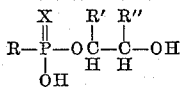

wherein R is a monovalent hydrocarbyl radical, R' and R'' are hydrogen or a monovalent aliphatic hydrocarbyl radical containing 1–6 carbon atoms, and X is sulfur or a mixture of oxygen and sulfur. Alkylene oxides react with hydrocarbyl thiophosphonic acid in absence of catalyst essentially on an equimolar basis to form mono-hydroxyalkyl thiophosphonates of the above formula. Hydroxyalkyl hydrocarbyl thiophosphonates may also be prepared by reacting hydrocarbyl thiophosphonic acid with alkylene carbonates such as ethylene carbonate and propylene carbonate.

As is well known, hydrocarbon-phosphorus pentasulfide reaction products are prepared by reaction of aromatic hydrocarbons, cycloaliphatic hydrocarbons and aliphatic hydrocarbons with $P_2S_5$ at elevated temperatures. Although a wide variety of hydrocarbons such as aliphatic-substituted aryl compounds and aryl-substituted aliphatic compounds are usable as the hydrocarbon reactant, olefins are generally employed as the hydrocarbon reactant. Lubricating oil fractions constitute another preferred class of materials for reaction with $P_2S_5$ to form a product which, after further treatment as outlined below, is converted to hydroxyalkyl hydrocarbyl thiophosphonates.

The olefinic hydrocarbons reacted with $P_2S_5$ usually contain at least 12 carbon atoms although lower molecular weight olefins can be employed. Monoolefin polymers such as isobutylene polymer, butylene polymer, propylene polymer and copolymers of monoolefins such as propylene-isobutylene copolymer are particularly preferred materials for reaction with $P_2S_5$. In general, monoolefin polymers and copolymers having an average molecular weight between about 250 and 50,000 are employed with polymers and copolymers having an average molecular weight in the range from about 600 to 5000 being particularly preferred. Copolymers of conjugated dienes and mono-olefins such as a copolymer of butadiene and isobutylene having an average molecular weight in the above-prescribed range also react with phosphorus pentasulfide. Particularly preferred olefin polymers are isobutylene polymers having average molecular weights between 600 and 5000.

Olefins useful for reaction with $P_2S_5$ are also prepared by halogenation of high molecular weight hydrocarbon fractions and subsequent dehydrohalogenation. Olefin fractions obtained by cracking of high molecular weight hydrocarbon fractions may also be used as the hydrocarbon reactant.

The reaction product obtained by reacting about 5 to about 40 percent $P_2S_5$ with a hydrocarbon at a temperature of from about 100–320° C. in a non-oxidizing atmosphere, for example, under a blanket of nitrogen, is hydrolyzed at a temperature between about 100 and 260° C. by contact with steam. Steam treatment hydrolyzes the hydrocarbon-$P_2S_5$ reaction product to a hydrocarbyl thiophosphonic acid and inorganic phosphorus acids. The hydrocarbyl thiophosphonic acid has the general formula:

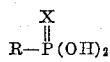

wherein R is the charge hydrocarbon radical, usually an olefinic radical containing 20 to 200 carbon atoms, and X is sulfur or a mixture of oxygen and sulfur. X in the above formula is designated as sulfur or a mixture of sulfur and oxygen because the steam hydrolysis steps usually result in replacement of a portion of the sulfur joined to phosphorus with oxygen.

The inorganic phosphorus acids formed during hydrolysis are removed prior to reaction with the alkylene oxide. A number of different procedures are available for removal of the inorganic phosphorus acids. In commonly-assigned copending application Serial No. 750,874, filed July 25, 1958 by H. D. Kluge, J. W. Wisner, Jr. and R. G. Lacoste, and U.S. 2,951,835 issued September 6, 1960 by the same inventors, removal of the inorganic phosphorus acids is effected by contact with synthetic hydrous alkaline earth metal silicates and synthetic hydrous alkali metal silicates, respectively. Another commonly-assigned copending application, Serial No. 841,668, filed September 23, 1959 by H. D. Kluge and R. G. Lacoste, describes a process wherein inorganic phosphorus acids are removed from the hydrolyzed product by extraction with anhydrous methanol.

Alkylene oxides which react with hydrocarbyl thiophosphonic acids in the absence of a catalyst on an equimolar basis to form the novel mono-hydroxyalkyl thiophosphonates of this invention are represented by the general formula:

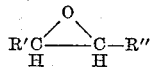

wherein R' and R'' are hydrogen or an aliphatic hydrocarbyl radical containing 1–6 carbon atoms. Examples of effective olefin oxides are the following: Ethylene oxide, propylene oxide, 1,2-butylene oxide, 2,3-butylene oxide, 1,2-pentylene oxide, 2,3-pentylene oxide, 1,2-hexylene oxide, 3-methyl-1,2-pentylene oxide, 2,3 - octylene oxide, 4-methyl-2,3-octylene oxide, 4-methyl-1,2-hexylene oxide and 3-methyl-1,2-butylene oxide.

Reaction of olefin oxide with hydrocarbyl thiophosphonic acid to produce the novel mono-hydroxyalkyl hydrocarbyl thiophosphonates of this invention is effected at a temperature between about 60 and 150° C. with temperatures of 80 to 125° C. being preferred. Atmospheric and superatmospheric pressures are employed for the reaction with pressure between about 10 and 500 lbs. p.s.i.g. being advantageous with the lower alkylene oxides.

The novel mono-hydroxyalkyl hydrocarbyl thiophosphonates are generally prepared by adding an excess of olefin oxide to the hydrocarbyl thiophosphonic acid prepared by hydrolysis of a hydrocarbon-$P_2S_5$ reaction product. The mol ratio of olefin oxide to acid in the reaction mixture varies between 1 and 4 but usually falls between 1.1 and 1.5. Excess olefin oxide is removed after completion of reaction by blowing the reaction mixture at elevated temperatures, generally with an inert gas such as nitrogen.

Examples 1 and 2 illustrate the preparation of hydrocarbyl thiophosphonic acids from polybutenes of different molecular weight. The remaining examples show the preparation of mono-hydroxyalkyl hydrocarbyl thiophosphonates from the thiophosphonic acids prepared by methods described in Examples 1 and 2.

*Example 1.*—A polybutene-$P_2S_5$ reaction product was prepared by reacting polybutene having an average molecular weight of about 780 with $P_2S_5$ in a mol ratio of polybutene to $P_2S_5$ of 1.1 and in the presence of sulfur in an amount equal to 1.3 weight percent of polybutene. After reaction at 450° F., until the mixture is soluble in n-pentane, the reaction product was diluted with approximately 140 weight percent of a naphthene base oil having an SUS at 100° F. of 100, steamed at 350° F. for 10 hours in a nitrogen atmosphere, and then dried by passage of nitrogen therethrough at 350° F. The hydrolyzed product was extracted with 50% by volume of methyl alcohol at 140° F. to give a methanol extract containing inorganic phosphorus acids and a lubriacting oil raffinate containing olefin-$P_2S_5$ product which after stripping free of methanol had a Neut. No. of 24.8.

*Example 2.*—A polybutene thiophosphonic acid was prepared by a similar procedure from a polybutene having an average molecular weight of about 940. The resulting lubricating oil raffinate prepared in this example had a Neut. No. of 23.1.

*Example 3.*—Polybutene (average molecular weight 780) thiophosphonic acid prepared as in Example 1 in the amount of 2900 g. (1.5 mols) was charged to a 5-liter, 3-necked flask equipped with a stirrer, a gas inlet tube extending below the surface of the acid reactant, a thermometer immersed in the acid, and a Dewar reflux condenser cooled with a Dry Ice-acetone mixture. The acid was heated to 121° C. over a ½-hour period with concurrent stirring and nitrogen blowing at approximately 1 liter per minute. While the temperature in the flask was maintained at 121° C. and the nitrogen flow rate was reduced to 5 or 10 ml./minute, ethylene oxide was passed through a trap in which it was mixed with the nitrogen and introduced into the reaction flask at a rate so as to maintain a gentle reflux. When ethylene oxide was no longer taken up as evidenced by an increase in the reflux rate, its addition was stopped and the excess ethylene oxide in the reaction mixture allowed to reflux for 1 hour. At the end of this period, ethylene oxide remaining in the reaction flask was flushed therefrom by passing nitrogen through the reaction mixture for ½ hour at a rate 1 liter/minute. The excess ethylene oxide was recovered in a Dry Ice-acetone trap attached to the outlet of the Dewar reflux condenser. The product was then stripped at about 150° C. and 2–3 mm. mercury pressure. On cooling there was obtained a reaction product which was shown by analysis to consist primarily of mono (2-hydroxyethyl)polybutenethiophosphonate of the following formula:

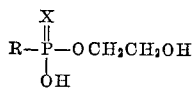

wherein A is the polybutene radical of 780 average molecular weight and X is a mixture of sulfur and oxygen. This product analyzed as follows:

|  | Calculated | Found |
| --- | --- | --- |
| Neut. No. | 0.0 | 1.0 |
| Hydroxyl No. | 28 | 23 |
| Percent Phosphorus | 1.56 | 1.83 |
| Percent Sulfur [1] | 1.60 | 0.74 |

[1] In this and subsequent analyses "calculated sulfur" is on basis that X is all sulfur.

*Example 4.*—1300 grams (0.5 m.) of the polybutene (average molecular weight of 940) thiophosphonic acid prepared as in Example 2 was reacted with 40 grams (0.56 m.) of 1,2-butylene oxide by a procedure similar to that employed in Example 3 with the exception that the butylene oxide was added via a dropping funnel. As a result of this reaction there was obtained a mono-hydroxybutyl polybutenethiophosphonate of the general formula:

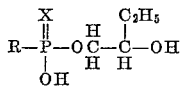

wherein R is a polybutene of 940 average molecule weight and X is a mixture of sulfur and oxygen. This product analyzed as follows:

|  | Calculated | Found |
| --- | --- | --- |
| Neut. No. | 0.0 | 2.88 |
| Hydroxyl No. | 21 | 15 |
| Percent Phosphorus | 1.16 | 0.94 |
| Percent Sulfur | 1.47 | 0.61 |

*Example 5.*—375 g. (0.18 mol) of the polybutene thiophosphonic acid prepared as in Example 1 was charged to a 3-necked flask equipped with a stirrer, Friedrich's condenser and a funnel extending below the surface of the acid. 50 ml. (0.72 mol) of propylene oxide was added dropwise to the acid at a temperature of about 90° C. over a 2.5 hour period. The excess propylene oxide was allowed to reflux for an additional hour at 100° C. The product was stripped of excess propylene oxide by heating to 190° C. at 28 mm. mercury pressure. The resulting product was shown by analysis to consist essentially of a mono-hydroxypropyl polybutenethiophosphonate of the following formula:

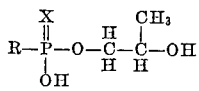

wherein R is the polybutene radical having an average molecular weight of 780 and X is a mixture of sulfur and oxygen. This product analyzed as follows:

|  | Calculated | Found |
| --- | --- | --- |
| Neut. No. | 0 | 2.55 |
| Hydroxyl No. | 24 | 22 |
| Percent Phosphorus | 1.34 | 1.20 |
| Percent Sulfur | 1.38 | 0.65 |

*Example 6.*—Approximately 15 gallons of a polybutene (average molecular weight 940) thiophosphonic acid similar to that prepared in Example 2 was reacted in 6000 g. batches with ethylene oxide in a 12-liter, 3-necked flask equipped with a stirrer, gas inlet tube and a thermometer. Air was removed from the system by heating to 93° C. while blowing with nitrogen. After addition of a Dewar reflux condenser containing a Dry Ice-acetone mixture to the system, ethylene oxide was added at a rate sufficient to maintain a gentle reflux from the condenser. The nitrogen flow was reduced to a trickle during the ethylene oxide addition. When rapid reflux of ethylene oxide was noted, ethylene oxide addition was stopped and the reaction mixture allowed to reflux for approximately 2 hours to assure completion of reaction. Excess ethylene oxide was then removed from the reaction mixture by increasing the nitrogen rate and blowing for 2 hours at a temperature of approximately 93° C. After 2 hours of nitrogen blowing, the product was cooled to room temperature. This procedure was repeated until 15 gallons of mono-hydroxyethyl polybutene thiophosphonate was obtained for subsequent engine testing. Analysis of a composite sample gave the following results:

|  | Calculated | Found |
|---|---|---|
| Neut. No | 0.0 | 0.69 |
| Hydroxyl No | 17 | 21 |
| Percent Phosphorus | 0.96 | 0.93 |
| Percent Sulfur | 0.99 | 0.62 |

Further proof of the structure of this material as mono (2-hydroxyethyl) polybutene thiophosphonate was obtained by infra-red analysis.

We claim:

1. Mono-hydroxyalkyl hydrocarbyl thiophosphonate having the formula:

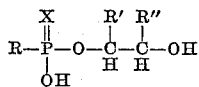

wherein R is a hydrocarbyl radical, X is selected from the group consisting of sulfur and a mixture of sulfur and oxygen and R' and R" are selected from the group consisting of hydrogen and an alkyl radical containing 1–6 carbon atoms.

2. The mono-hydroxyalkyl hydrocarbyl thiophosphonates of claim 1 wherein R is an olefinic radical containing at least 12 carbon atoms.

3. Mono-hydroxyalkyl hydrocarbyl thiophosphonates of claim 1 wherein R is a polyolefin having an average molecular weight between 250 and 50,000 and preferably between 600 and 5000.

4. Mono(2-hydroxyethyl) hydrocarbyl thiophosphonate having the formula:

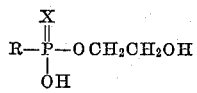

wherein R is a polyolefin radical having an average molecular weight between 250 and 50,000 and X is a mixture of sulfur and oxygen.

5. A mono-2-hydroxyethyl hydrocarbyl thiophosphonate of claim 4 wherein R is a polybutene radical having an average molecular weight of 940.

6. A mono-hydroxypropyl hydrocarbyl thiophosphonate having the formula:

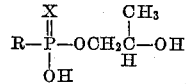

wherein R is a polyolefin radical having an average molecular weight between 250 and 50,000 and X is a mixture of sulfur and oxygen.

7. A mono-hydroxypropyl hydrocarbyl thiophosphonate of claim 6 in which said R is a polybutene radical having an average molecular weight of 780.

8. A mono-hydroxybutyl hydrocarbyl thiophosphonate having the formula:

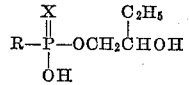

wherein R is a polyolefin hydrocarbyl radical having an average molecular weight between 250 and 50,000 and X is a mixture of sulfur and oxygen.

9. A mono-hydroxybutyl thiophosphonate of claim 8 in which R is a polybutene radical having an average molecular weight of 940.

References Cited in the file of this patent
FOREIGN PATENTS

| 792,553 | Great Britain | Mar. 26, 1958 |
| 838,928 | Great Britain | June 22, 1960 |